(No Model.)

F. C. P. ROBINSON.
ARTIFICIAL BAIT.

No. 326,886. Patented Sept. 22, 1885.

WITNESSES:  
INVENTOR:  
Frederic C. P. Robinson  
by E. B. Bammus att'y

UNITED STATES PATENT OFFICE.

FREDERIC C. P. ROBINSON, OF NEW YORK, ASSIGNOR, BY DIRECT AND MESNE ASSIGNMENTS, TO THOMAS J. CONROY, OF BROOKLYN, N. Y.

ARTIFICIAL BAIT.

SPECIFICATION forming part of Letters Patent No. 326,886, dated September 22, 1885.

Application filed October 20, 1881. (No model.)

*To all whom it may concern:*

Be it known that I, FREDERIC C. P. ROBINSON, a subject of the Queen of Great Britain, residing at the city of New York, in the county of New York and State of New York, have invented certain new and useful Improvements in Artificial Bait for Fish-Tackle, of which the following is a specification.

The object of my invention is to construct an artificial bait to resemble a rat or mouse, and this object is attained by the mechanism illustrated in the accompanying drawings, in which—

Figure 1:
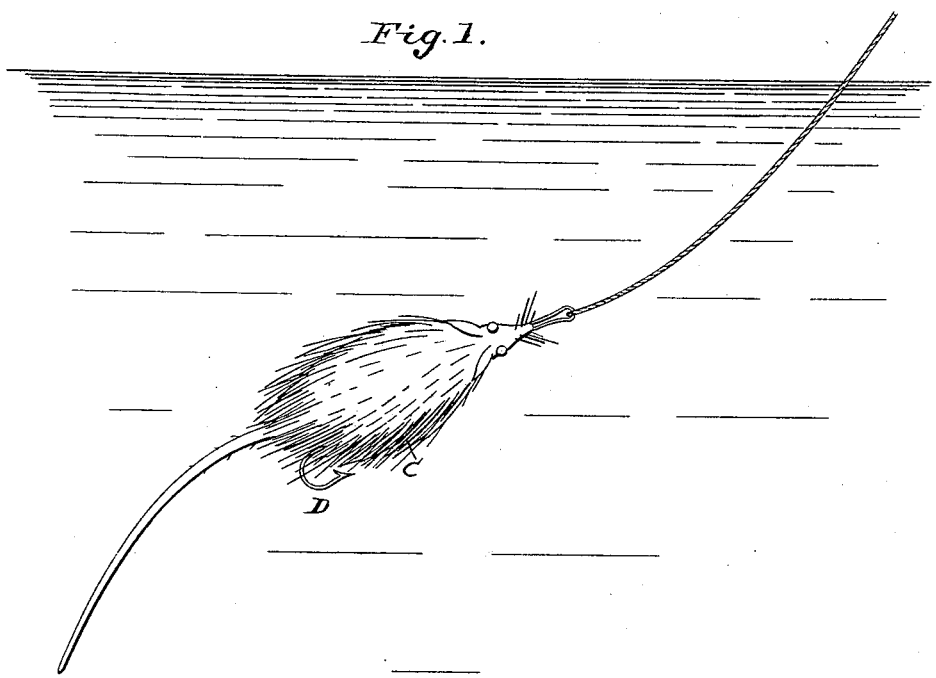
Figure 2:
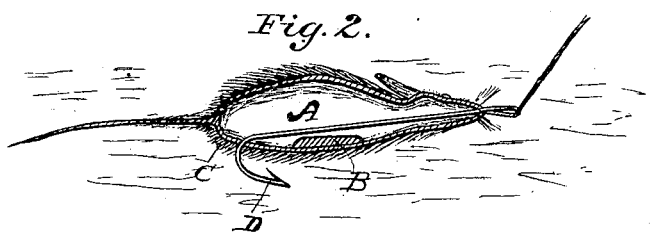

Figure 1 represents the bait attached to the hook and snell or leader, and Fig. 2 a longitudinal section of the same, showing one form of weighting the bait.

The body or filling A of the imitation rat or mouse may be made of cork or other suitable material. This body should be loaded or weighted, as at B, sufficiently to keep it right side up. The body is covered with fur or hair C on the skin or otherwise, or of material in imitation thereof, so colored and applied as to resemble the skin and hair of a rat or mouse, which covering should be patterned so as to be worked at one end into the shape of a head supplied with eyes of glass or other reflecting material, and at the other end to the shape of the rump of a mouse, to which a caudal appendage of feathers or other material may be attached.

Preferably through the body of the mouse, from nose to tail, I run the shank of the hook D, or a bar constructed so as to take at either end a gang or gangs of two or more hooks each, to which shank or bar the body and coverings should be very securely fastened.

To the end of the shank of the hook or the front end of the bar means are provided for securely fastening the snell-header or lines, of any ordinary approved construction. This artificial bait has been found very killing for large fish in fresh waters, and has proved serviceable in salt-water along the coast.

Having described my invention, what I claim, and desire to secure by Letters Patent, is—

An artificial bait constructed of light material—such as cork—suitably covered to imitate a mouse, and weighted so as to maintain its proper position in the water, in combination with the shank of a hook, substantially as and for the purpose described.

FREDERIC C. P. ROBINSON.

Witnesses:
THOMAS E. MULLISON,
JEREMIAH SULLIVAN.